(12) United States Patent
Rankin

(10) Patent No.: US 7,367,219 B1
(45) Date of Patent: May 6, 2008

(54) AUTOMATIC CONTROL OF LEAK TEST UNIT DURING TESTING AND ANALYSIS OF AN ENGINE

(75) Inventor: Brent C. Rankin, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/617,289

(22) Filed: Dec. 28, 2006

(51) Int. Cl.
*G01M 3/26* (2006.01)
*G01M 15/00* (2006.01)

(52) U.S. Cl. .................................. 73/40; 73/49.7
(58) Field of Classification Search ............... 73/40, 73/49.7
See application file for complete search history.

(56) References Cited

U.S. PATENT DOCUMENTS

| | | | |
|---|---|---|---|
| 3,800,586 A | 4/1974 | Delatorre et al. | |
| 4,272,985 A | 6/1981 | Rapson, Jr. et al. | |
| 4,523,452 A | 6/1985 | Brayman | |
| 4,715,214 A | 12/1987 | Tveter et al. | |
| 4,885,935 A | 12/1989 | Feller et al. | |
| 5,086,403 A | 2/1992 | Slocum et al. | |
| 5,239,858 A | 8/1993 | Rogers et al. | |
| 5,492,006 A | 2/1996 | Beckett | |
| 5,540,083 A | 7/1996 | Sato et al. | |
| 5,585,549 A | 12/1996 | Brevick et al. | |
| 5,847,264 A | 12/1998 | Martin et al. | |
| 5,848,372 A | 12/1998 | Ito et al. | |
| 5,883,301 A | 3/1999 | Filippi et al. | |
| 6,435,018 B1 | 8/2002 | Murakami et al. | |
| 6,711,944 B2 | 3/2004 | Maruta et al. | |

*Primary Examiner*—Daniel S. Larkin
(74) *Attorney, Agent, or Firm*—Rankin, Hill & Clark LLP; Vincent Ciamacco

(57) ABSTRACT

A method and apparatus for developing a test for determining if an engine has oil seal leaks. The engine is charged with a predetermined pressure of air and monitored by a leak tester. A digital valve is set to provide a certain leak rate based upon signals received from a digital valve controller. Thereafter, based upon signals received from a PC and a main control unit, a variety of trials are completed. The results and programs are stored in the PC. Results of the trials allow an optimized testing program to be selected that would be best suited for use on a manufacturing assembly line.

10 Claims, 3 Drawing Sheets

AUTOMATIC CONTROL OF LEAK TEST UNIT DURING TESTING AND ANALYSIS OF AN ENGINE

BACKGROUND OF THE INVENTION

1. Field of the Invention

The present invention generally relates to engine leak testing and more specifically, toward a method for developing a program for engine leak testing that will subsequently be used on a manufacturing assembly line.

2. Description of Related Art

During the manufacture of engines, it is desirable to test the assembled engine to determine if any of the various oil seals are leaking. Due to the construction of modern engines, it has proven difficult to develop engine leak testing methods that can be employed quickly, as is required for manufacturing efficiency. Furthermore, the testing methods are usually specific to individual engine types and thus new testing programs must be developed every time a new engine design is produced.

Development of these testing programs can be very labor intensive and requires a large amount of time. For example, when developing the testing programs, one of the set parameters, the leak rate, may range from 100 cc/min to 5000 cc/min, in increments of 25 cc/min. This results in about 200 different trials that must be run in order to properly develop a new program.

One known testing method that has been employed in the past involves having a user manually adjust and confirm the leak rate for each incremental change. Running the trials at different leak rates requires that the user change orifices to adjust the set leak rate. And, as each trial is typically run 3 to 5 times, development of a single program can require several hundred iterations. Furthermore, a wait time of typically two minutes is used between trials to ensure that any fluid pressure in the engine from the previous trial has dissipated. Accordingly, the known testing method is not an effective technique for developing a program for detecting engine oil leaks.

Therefore, there exists a need in the art for a method of efficiently developing testing programs for an engine.

SUMMARY OF THE INVENTION

The present invention is directed toward a method for developing a testing program to analyze an engine for oil leaks. In accordance with the present invention, a plurality of leak testing programs may be sequentially run on a subject engine. During each testing program, the engine is charged with pressurized air. After the engine is pressurized, the supply of pressurized air to the engine is discontinued and a digital valve is opened to allow pressurized air to leak from the engine at a predetermined controlled rate while the engine pressure is measured for a predetermined period of time. The measured pressure drop is used to establish the rate at which the engine leaks. After running several test programs, it can be determined which program would be best suited for use on the assembly line to test new engines. Therefore, the testing procedure of the present invention permits selection of the optimum testing program for subsequent use on the assembly line to permit leak testing of each engine during assembly or manufacture thereof.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
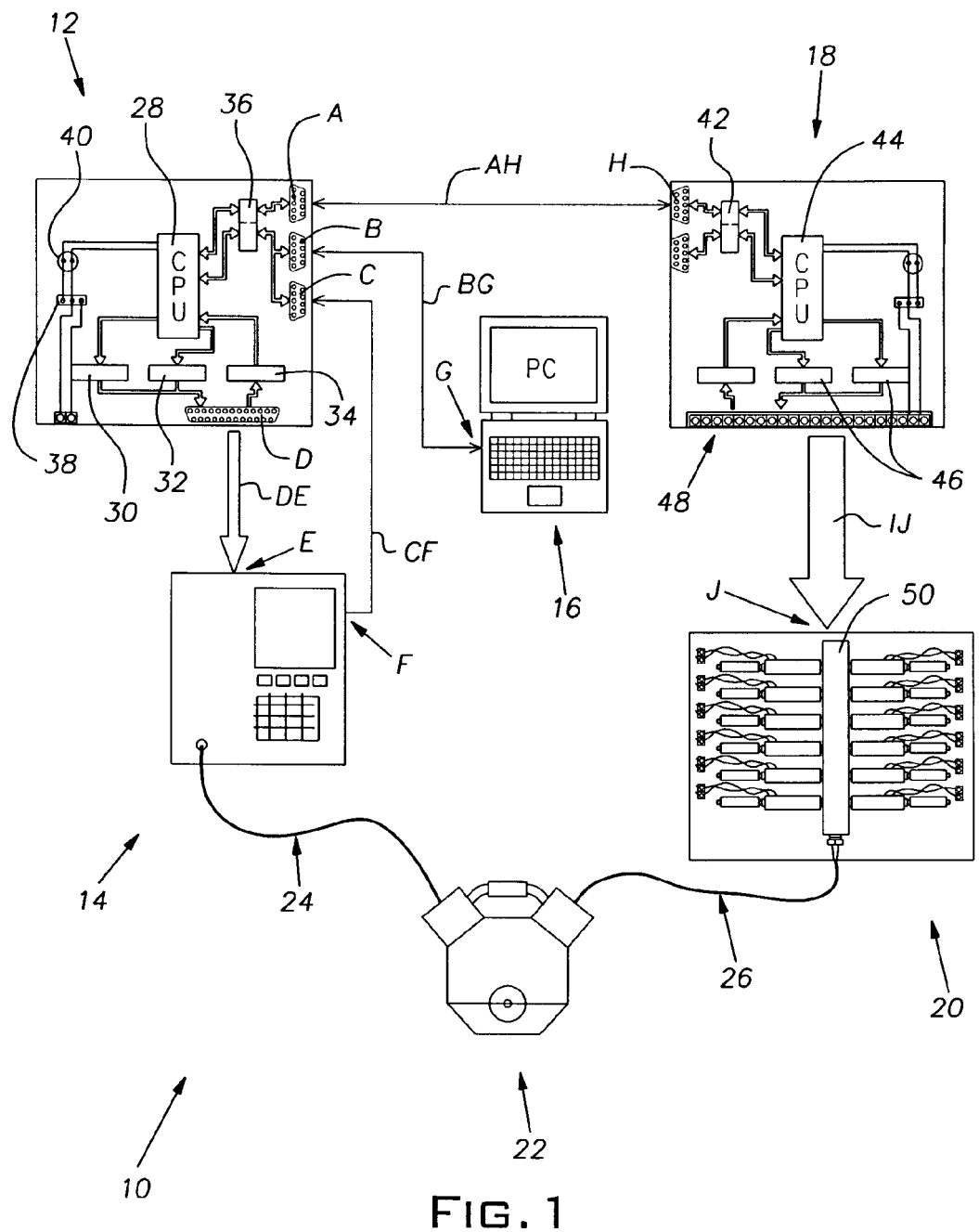
FIG. 1 is a schematic view of a leak tester development system.

With reference to FIG. 1, a leak tester development system 10 is illustrated. The leak tester development system 10 includes a main control unit 12, a leak tester 14, a computer (PC) 16, a digital valve controller 18, and a digital valve 20. Further, an engine 22 is attached to the leak tester 14 and the digital valve 20 by a supply hose 24 and a discharge tube 26, respectively. The supply hose 24 and discharge tube 26 are fluidly connected to the same cavity in the engine 22.

The main control unit 12 includes an MCU CPU 28, three quad optical isolators 30, 32, 34, a driver chip 36, a voltage regulator 38, and a filter capacitor 40. A cable CF is connected between a port C of the main control unit 12 and a port F of the leak tester 14. Further, a cable DE is connected between a port D of the main control unit 12 and a port E of the leak tester 14. The main control unit 12 communicates with the PC 16 through the port B, cable BG, and port G. Finally, the main control unit 12 communicates with the digital valve controller 18 via port A, cable AH, and port H.

The digital valve controller 18 includes an integrated circuit converter 42, a digital control valve (DVC) CPU 44, optical isolators 46, and a terminal strip 48. The digital valve controller 18 communicates with the digital valve 20 through the terminal strip 48 and a cable IJ.

Figure 2:
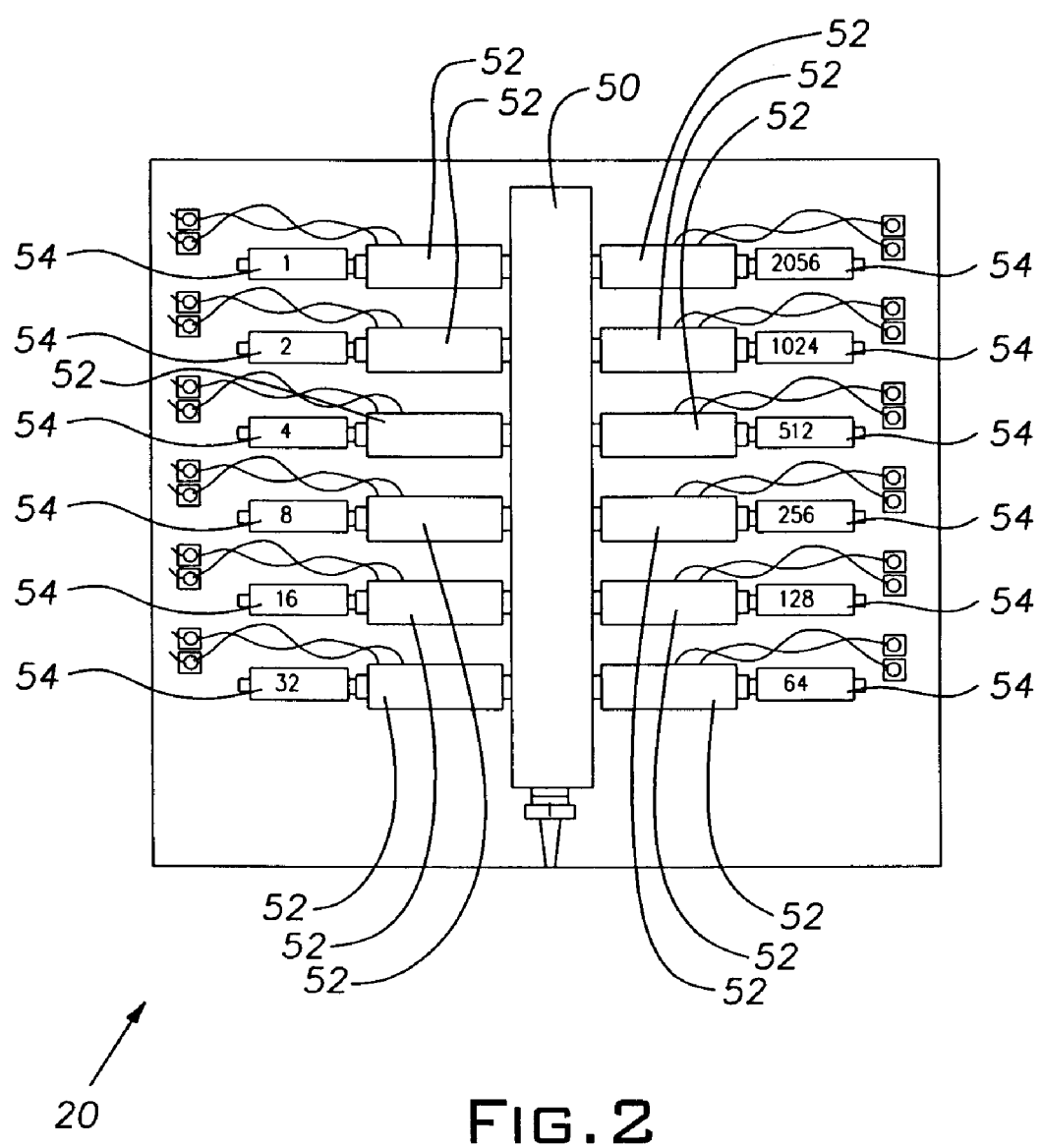
FIG. 2 is a schematic view of a digital valve of the leak tester development system.

With reference to FIGS. 1 and 2, the digital valve 20 includes a manifold 50 and a plurality of individual valves 52. Each of the individual valves 52 includes a calibrated orifice 54. Further, the digital valve 20 has port J for communication with the digital valve controller 18.

With continued reference to FIG. 1, the leak tester development system 10 is shown in connection with the engine 22 that is to be tested. The supply hose 24 and discharge tube 26 sealingly engage associated portions of the engine 22. The supply hose 24 is used to introduce pressurized air into the engine 22 so as to pressurize a cavity the engine 22 (e.g., oil passages), while the discharge tube 26 is used to controllably vent or remove air from the engine 22.

It is noted that the engine 22 described to this point is relatively conventional and well known in the art, and that the engine structure forms no part of the present invention. It is further noted that the leak tester development system 10 of the present invention is not limited to the engine structure described herein, which is exemplary in nature. Rather, it is considered apparent that, with the principles described herein, one skilled in the art could easily adapt the method of the present invention to any engine design.

While the components of the leak tester development system 10 are illustrated as being connected to each other with various types of cables or wires, it is considered apparent that other connection means/methods could be utilized to provide the necessary communication between the components. For example, wireless communication methods could be employed to provide communication between the components.

With reference to FIGS. 1 and 2, assembly and operation of the leak tester development system 10 will now be discussed. A user (not shown) inputs requested data into the PC 16. Although not limited thereto, the requested data preferably includes a speed that the leak tester 14 and the main control unit 12 will communicate, a first program that will be run, a last program that will be run, a beginning leak rate, an ending leak rate, a leak rate interval, a number of cycles per increment, and a wait time between trials. Alternatively, the requested data may simply be the program to run should the stored programs include all the necessary testing parameters. The programs to be run are pre-loaded or stored in the main control unit 12. The programs can include an input by the user that represents a first length of time that the system 10 is allowed to charge the engine 22 with air before the digital valve 20 is opened. The programs can also include an input by the user that represents a second length of time that the digital valve 20 is to be open to allow air to escape. The data is then communicated to the main control unit 12 with commercially available terminal software such as Procomm Plus by Symantec of Cupertino, Calif.

Power is provided to the main control unit 12 through the voltage regulator 38 and the filter capacitor 40. The MCU CPU 28 contains software necessary for operation of the leak tester development system 10. Further, the MCU CPU 28 is connected to two quad optical isolators 30, 32 for control of the output to the leak tester 14, and to one quad optical isolator 34 for the input from the leak tester 14. The MCU CPU 28 is also connected to the driver chip 36. The driver chip 36 conditions serial communication between the MCU CPU 28 and the digital valve controller 18 and the PC 16.

The main control unit 12 sends a signal through the port D, via the cable DE, to port E of the leak tester 14, of the starting and ending programs to be executed. Further, the main control unit 12 instructs the digital valve controller 18 via the port A and the port H (connected by the cable AH), of the starting and ending leak rates, the leak rate interval, the number of cycles per increment, and the wait time between trials.

The signals from the main control unit 12, via cable AH, are converted by the integrated circuit converter 42 into a signal compatible with the DVC CPU 44. The DVC CPU 44 then responds to the main control unit 12 that the digital valve controller 18 is ready to receive data. After receiving the requested leak rates, the DVC CPU 44 outputs binary coded decimal code that is conditioned by the optical isolators 46. The optical isolators 46 amplify an output current from the DVC CPU 44 and then send a signal to the terminal strip 48.

In the preferred embodiment, the leak tester development system 10 provides air at about 0.2 kg/cm². However, other air pressures are possible and contemplated. The pressurized air, at the predetermined pressure, is provided to the engine 22 via the leak tester 14. After the engine 22 is pressurized for a set time as input by the user or the program, the digital valve 20 is set to the desired leak rate and measurements begin. As will be apparent to those skilled in the art, the leak tester 14 is adapted, once the engine 22 is pressurized, to monitor leakage of air from the pressurized engine 22 by sensing or measuring drops in engine pressure. A suitable leak tester is sold by Cosmo Instruments Co., Ltd. of Tokyo, Japan, as model number LS-1841.

The port J of the digital valve 20 receives the signals from the terminal strip 48 of the digital valve controller 18 through the cable IJ. These signals control which of the individual valves 52 are opened. When the valves 52 are open, air can flow from the engine 22, through the discharge tube 26, the manifold 50, and then through orifice 54. Each orifice 54 has a specific flow rate at a specific pressure. As is illustrated in FIG. 2, the flow rate of each orifice 54 is binary weighted so that a flow rate from 1 cc/min to over 4000 cc/min, in 1 cc/min intervals is possible. That is, by having valves 52 with flow rates of 1, 2, 4, 8, 16, 32, 64, 128, 256, 512, 1024, and 2048 cc/min, a variable flow rate (by 1 cc/min) intervals is achievable.

Also, after the trial is completed, test results and settings associated with the specific trial are sent from the port F of the leak tester to the port C of the main control unit 12 through the cable CF. Then, the test results and associated settings are communicated via the port B of the main control unit 12 and the cable BG, to the port G of the PC 16. Subsequently, a file is created on the PC 16 to record the test results and associated settings.

Figure 3:
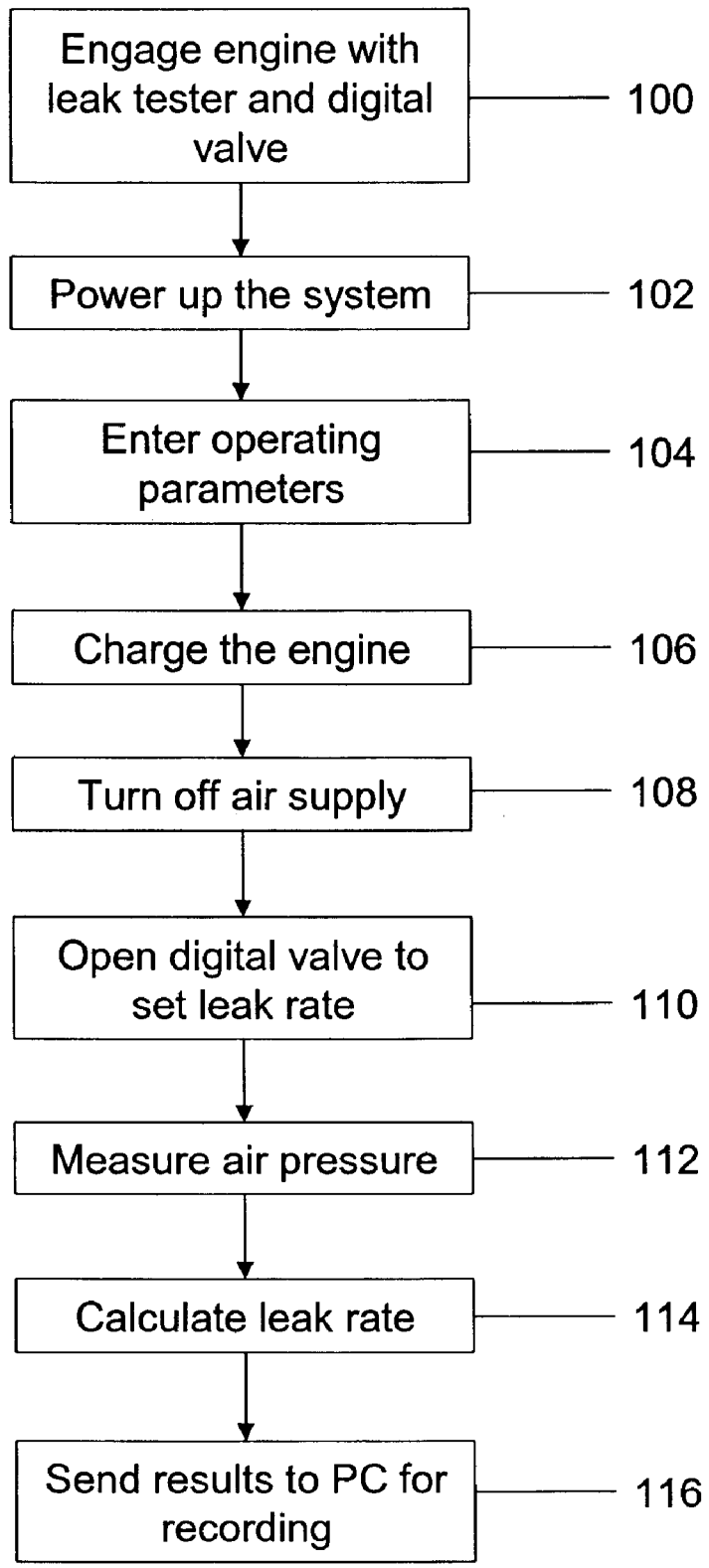
FIG. 3 is a flow chart illustrating a method of using the leak tester development system.

With reference to FIG. 1 and specifically FIG. 3, steps in developing a testing procedure will be described. Initially, the leak tester 14 and the digital valve 20 are sealingly engaged with the engine 22 (step 100) and power is supplied to the system 10 (step 102). A variety of operating parameters, such as a speed that the leak tester 14 and the main controller 12 will communicate, a first program that will be run, a last program that will be run, a beginning leak rate, an ending leak rate, a leak rate interval, a number of cycles per increment, and a wait time between trials are input into the PC 16 and are subsequently transmitted to other components in the system 10 (step 104). Then, air is provided to the engine 22 via the supply hose 24 to charge the engine 22 with pressurized air (step 106). After reaching a desired pressure, the air supply is turned off (step 108) and the digital valve 20 is set to allow the inputted leak rate (step 110) occur. After a required time has passed, engine air pressure is measured (step 112) and the leak rate is calculated (step 114). The calculated leak rate and operating parameters are then sent to the PC 16 to be recorded (step 116). If required by instructions as inputted by the user, the trial can be repeated with alternative leak rates, and durations, all without manual adjustment of the digital valve 20 by the user.

While the present invention has been described with particularity herein, it is considered apparent that the numerous modifications or additions may be resorted to without departing from the scope and spirit of the present invention. Rather, taken broadly, the present invention teaches a method of developing programs for pressure testing an engine for possible oil leaks. Accordingly, the present invention is not limited to the preferred embodiment that has been described with particularity hereinbefore, but rather is only to be defined by the claims appended hereto.

What is claimed is:

1. A leak tester development system for automatically developing and optimizing leak test programs for vehicle engines, comprising:
    a leak tester that pressurizes the engine and measures a pressure change in the engine;
    a digital valve that provides an adjustable leak orifice for the engine;
    a digital valve controller that controls the digital valve;
    a computer for inputting data into the system and providing instructions to the leak tester and the digital valve controller, wherein said computer also records the pressure change and the inputted data; and
    a main control unit that transmits and receives data to and from the leak tester, the digital valve controller, and the computer.

2. The leak tester development system of claim 1, wherein the digital valve provides a plurality of adjustable leak orifices for the engine.

3. The leak tester development system of claim 1, wherein the digital valve further comprises a manifold for air to flow from the engine to the adjustable leak orifice.

4. A method for developing and optimizing leak test programs for vehicle engines by using a digital valve, a digital valve controller, a main control unit, and a computer, comprising the steps of:
- engaging the engine with the leak tester and the digital valve;
- supplying power to the digital valve, the digital valve controller, computer, and the main control unit;
- setting operating parameters with the computer;
- charging the engine with pressurized air until a desired pressure is reached and then turning off the pressurized air;
- setting the digital valve to allow an inputted leak rate from the engine;
- measuring engine air pressure;
- calculating a leak rate of the engine; and
- sending the leak rate and operating parameters to the computer to be recorded.

5. The method for developing and optimizing leak test programs of claim 4, wherein the step of setting operating parameters with the computer includes the setting of a speed that the leak tester and the main controller will communicate.

6. The method for developing and optimizing leak test programs of claim 4, wherein the step of setting operating parameters with the computer includes the setting of a first program that will be run and a last program that will be run.

7. The method for developing and optimizing leak test programs of claim 4, wherein the step of setting operating parameters with the computer includes the setting of a beginning leak rate and an ending leak rate.

8. The method for developing and optimizing leak test programs of claim 4, wherein the step of setting operating parameters with the computer includes the setting of a leak rate interval.

9. The method for developing and optimizing leak test programs of claim 4, wherein the step of setting operating parameters with the computer includes the setting of a number of cycles per increment.

10. The method for developing and optimizing leak test programs of claim 4, wherein the step of setting operating parameters with the computer includes the setting of a wait time between trials.

* * * * *